United States Patent
Tressler et al.

(10) Patent No.: US 6,721,893 B1
(45) Date of Patent: Apr. 13, 2004

(54) SYSTEM FOR SUSPENDING OPERATION OF A SWITCHING REGULATOR CIRCUIT IN A POWER SUPPLY IF THE TEMPERATURE OF THE SWITCHING REGULATOR IS TOO HIGH

(75) Inventors: Chris Tressler, Austin, TX (US); Mary Chen, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 641 days.

(21) Appl. No.: 09/591,993

(22) Filed: Jun. 12, 2000

(51) Int. Cl.[7] ................................. G06F 1/26
(52) U.S. Cl. ................. 713/300; 713/324; 713/340
(58) Field of Search ................. 713/300, 320, 713/324, 340; 320/5, 14, 32, 35

(56) References Cited

U.S. PATENT DOCUMENTS

| | | | |
|---|---|---|---|
| 4,349,772 A | | 9/1982 | Weiss |
| 4,812,733 A | | 3/1989 | Tobey |
| 4,893,271 A | | 1/1990 | Davis et al. |
| 5,142,684 A | | 8/1992 | Perry et al. |
| 5,189,314 A | | 2/1993 | Georgiou et al. |
| 5,287,292 A | | 2/1994 | Kenny et al. |
| 5,608,304 A | * | 3/1997 | Okumura ............ 320/134 |
| 5,687,066 A | | 11/1997 | Cook, II |
| 5,689,958 A | * | 11/1997 | Gaddis et al. .......... 62/3.7 |
| 5,713,030 A | * | 1/1998 | Evoy ................... 713/322 |
| 5,903,138 A | * | 5/1999 | Hwang et al. ......... 323/266 |
| 6,137,274 A | * | 10/2000 | Rajagopalan ......... 323/272 |
| 6,144,194 A | * | 11/2000 | Varga ................... 323/285 |
| 6,286,109 B1 | * | 9/2001 | Pirdy ................... 713/340 |

FOREIGN PATENT DOCUMENTS

| | | |
|---|---|---|
| DE | 31 25 529 A1 | 1/1983 |
| EP | 0 880 086 A1 | 11/1998 |
| JP | 58 148694 A | 9/1983 |
| JP | 11191954 A * | 7/1999 ........ H02M/3/155 |

OTHER PUBLICATIONS

"CRT Degauss Circuit", IBM Technical Disclosure Bulletin, May 1, 1985, US, p. 7185.*
International Search Report for Application No. PCT/US 01/07678 mailed Sep. 4, 2001.

* cited by examiner

Primary Examiner—Thomas Lee
Assistant Examiner—Paul Yanchus, III
(74) Attorney, Agent, or Firm—Meyertons, Hood, Kivlin, Kowert, & Goetzel, P.C.; B. Noël Kivlin

(57) ABSTRACT

A thermal protection circuit for high output power supplies. A power supply circuit includes a switching control circuit coupled to a switching regulator circuit. The switching control circuit is configured to generate a plurality of switching control signals for controlling the switching regulator circuit. The power supply circuit also includes a temperature sensitive circuit which includes a thermistor. The temperature sensitive circuit is configured to provide a variable voltage level output to the phase control circuit. The switching control circuit is also configured to suspend operation of the switching regulator circuit upon detecting a predetermined voltage level at the output.

34 Claims, 3 Drawing Sheets

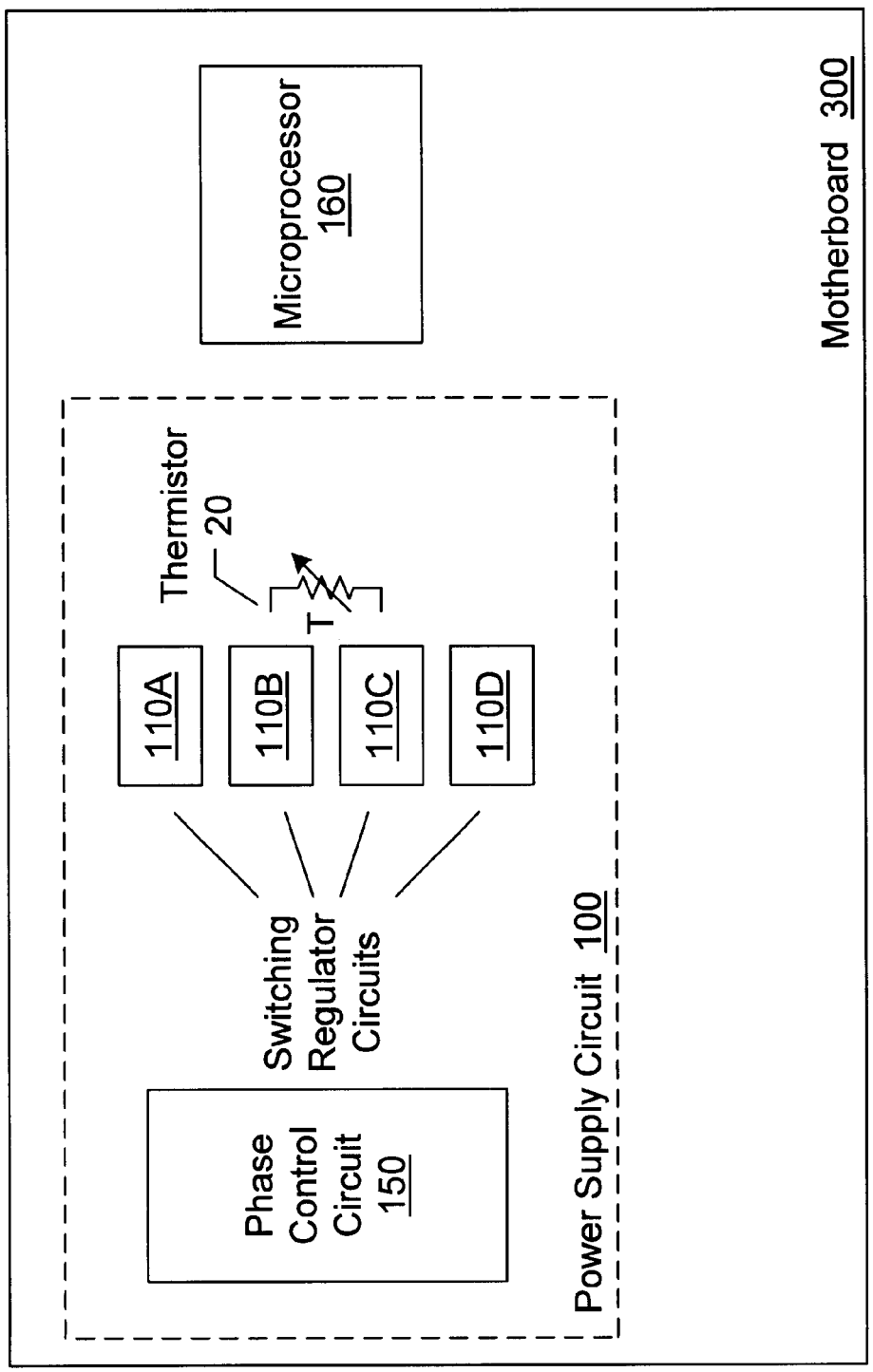

SYSTEM FOR SUSPENDING OPERATION OF A SWITCHING REGULATOR CIRCUIT IN A POWER SUPPLY IF THE TEMPERATURE OF THE SWITCHING REGULATOR IS TOO HIGH

BACKGROUND OF THE INVENTION

1. Field of the Invention

This invention relates to power supplies and, more particularly, to the protection of microprocessor power supplies.

2. Description of the Related Art

Power supplies are used in various types of devices. There are many specialized types of power supply circuits with various advantages and disadvantages. Microprocessors in computers may require a power supply circuit that regulates a high level of current while maintaining a high level of efficiency.

One such type of specialized power supply circuit is a switching regulator. Switching regulator circuits typically provide a lower voltage output than the unregulated input while at the same time providing a higher current than the current drawn from the unregulated supply. This is accomplished using a transistor that is constantly switching between a saturation mode and a non-conducting mode. Typically a transistor that is optimized for power applications, such as a power field effect transistor, is used. Because the transistor is either in saturation or not conducting, there is very low power dissipation. A switching regulator therefore can regulate a high amount of current at a high efficiency rate.

Since these power supply circuits regulate a high level of current during normal operation, they may also generate a significant amount of heat while operating. Under normal operating conditions the heat may not cause problems. However, under less than ideal conditions such as, for example, short circuits, improper power supply operation and unacceptable environmental conditions, the heat may become excessive. Excessive heat may cause damage to various computer system components including the motherboard, the microprocessor, or the power supply itself.

The heat generated by the switching regulator may be controlled by methods such as directed airflow and the use of heat sinks. These methods may be effective in some cases, but in order to accommodate the worst case operating conditions, those methods may be expensive. Additionally, it may be impossible to anticipate the worst possible conditions.

SUMMARY OF THE INVENTION

Various embodiments of a power supply circuit including a thermal protection circuit are disclosed. In one embodiment, the power supply circuit includes a switching control circuit coupled to a switching regulator circuit. The switching control circuit is configured to generate a plurality of switching control signals for controlling the switching regulator circuit. The power supply circuit also includes a temperature sensitive circuit including a thermistor. The temperature sensitive circuit is configured to provide a variable voltage level output to the phase control circuit. The switching control circuit is also configured to suspend operation of the switching regulator circuit upon detecting a predetermined voltage level at the output.

In another embodiment, the power supply circuit includes a phase control circuit coupled to a first switching regulator circuit and to a second switching regulator circuit. The phase control circuit is configured to generate a plurality of switching control signals for controlling switching of the first and second switching regulator circuits. The phase control circuit is also configured to selectively suspend operation of the second switching regulator circuit in response to receiving a signal indicative of a low power mode of operation. The power supply circuit also includes a temperature sensitive circuit which includes a thermistor. The temperature sensitive circuit is configured to provide a variable voltage level output to the phase control circuit. The phase control circuit is further configured to suspend operation of the first and second switching regulator circuits upon detecting a predetermined voltage level at the output.

In various other embodiments, the thermistor is configured to detect an elevation in temperature of the first switching regulator circuit or the second switching regulator circuit and to change a resistance value internal to the thermistor. Furthermore, the thermistor is configured to decrease the internal resistance value in response to detecting the elevation in temperature. The temperature sensitive circuit develops the predetermined voltage level in response to the thermistor decreasing the internal resistance value.

BRIEF DESCRIPTION OF THE DRAWINGS

FIG. 3 is a diagram of one embodiment of a motherboard of a computer system including a power supply circuit.

Figure 1:
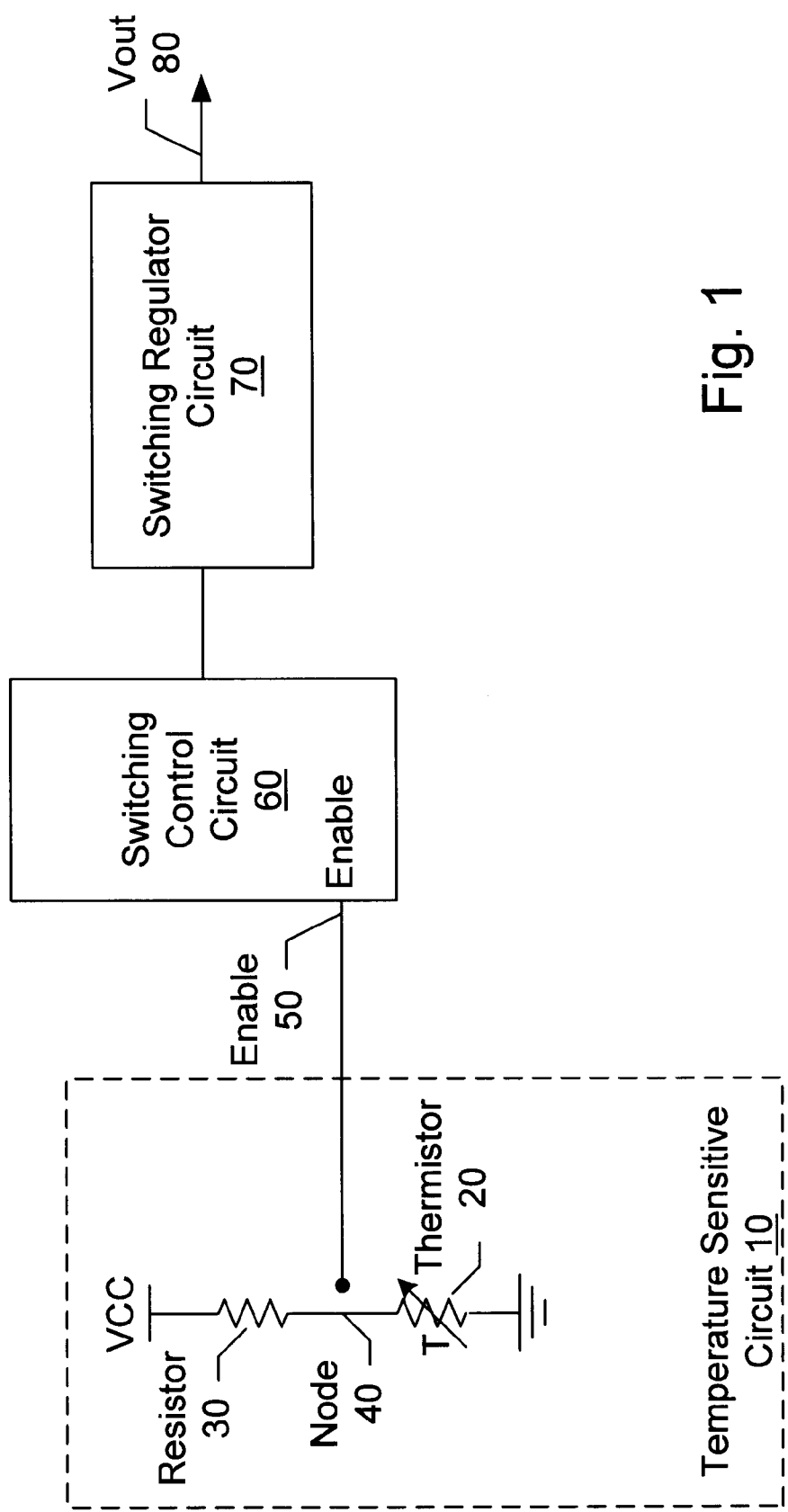
FIG. 1 is a block of one embodiment of a switching power supply circuit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to FIG. 1, a block diagram of one embodiment of a switching power supply circuit is shown. The switching power supply circuit of FIG. 1 includes a switching control circuit 60 coupled to a switching regulator circuit 70. The output of switching regulator circuit 70 is Vout 80 and it may used to power a microprocessor (not shown). Switching control circuit 60 is also coupled to a temperature sensitive circuit 10.

In this embodiment, switching regulator circuit 70 may include one or more power transistors and various other components (not shown), which are used to regulate a supply voltage for use by a microprocessor or other device. It is noted that in other embodiments there may be more switching regulator circuits. Switching control circuit 60 is configured to generate control signals for switching regulator circuit 70. The control signals switch the transistors on and off.

In one embodiment, switching control circuit 60 includes an enable input, which when activated by an active enable signal 50 allows normal operation of switching control circuit 60. However, when enable signal 50 is deactivated, switching control circuit 60 suspends operation of switching regulator circuit 70. In this embodiment, an active signal means a logic value of one, while a deactivated signal refers to a logic value of zero.

A node 40 of temperature sensitive circuit 10 is connected to the enable input of switching control circuit 60. In one embodiment, temperature sensitive circuit 10 is a voltage divider circuit, which includes a thermistor 20 and a resistor 30. One lead of resistor 30 is connected to VCC, while the other lead of resistor 30 is connected to one lead of thermistor 20. The second lead of thermistor 20 is connected to circuit ground. The voltage divider circuit develops a voltage across resistor 30 and thermistor 20 proportional to the resistance of each component. Therefore, to calculate the voltage at node 40 of FIG. 1, the equation is as follows: $V_{node}=VCC\ (R_{thermistor})/(R_{thermistor}+R_{resistor})$. However, since the resistance value of thermistor 20 varies with changes in temperature, the voltage developed at node 40 also varies with changes in temperature. In this particular embodiment, the resistance value of thermistor 20 decreases with increases in temperature. This type of thermistor is said to have a negative temperature coefficient. It is contemplated that other types of thermistors may be used, such as those having a positive temperature coefficient. In other embodiments, it is contemplated that other temperature sensitive circuits may be used such as, for example, active components such as transistors. Additionally, if the enable input of switching control circuit 60 were an active low input, the voltage divider may be reconfigured such that thermistor 20 is connected to VCC and resistor 30 is connected to ground.

As described above, the voltage developed at node 40 is dependent upon the selected resistance value of resistor 30 and the ambient resistance value of thermistor 20. If the ambient temperature of thermistor 20 increases, the resulting decrease in the resistance value of thermistor 20 will cause a proportional decrease in the voltage at node 40. Conversely, a decrease in the ambient temperature of thermistor 20 will cause an increase in the voltage at node 218. The voltage at node 40 may vary between zero volts and the maximum voltage level capable of developing across thermistor 20 depending on the selected resistance value of resistor 30 and the range of resistance values that thermistor 20 can achieve. Therefore, to achieve a particular ambient temperature voltage level at node 40, proper resistance values must be calculated and chosen for resistor 30 and thermistor 20.

As will be described in more detail below, thermistor 20 is located such that it may detect a rise in a temperature corresponding to the ambient operating temperature of switching regulator circuit 70. If the ambient temperature begins to increase, the resistance value of thermistor 20 will begin to decrease causing a proportional decrease of the voltage at node 40. If the voltage decreases below the threshold of the enable input circuitry of switching control circuit 60, then switching control circuit 60 will detect the enable signal 50 as inactive and switching control circuit 60 will disable operation of switching regulator circuit 70. This action will power down any devices that are powered by switching regulator circuit 70.

If the ambient temperature begins to decrease, the resistance value of thermistor 20 will begin to increase causing a proportional increase of the voltage at node 40. If the voltage increases above the threshold of the enable input circuitry of switching control circuit 60, then switching control circuit 60 will detect the enable signal 50 as active and switching control circuit 60 will enable operation of switching regulator circuit 70. This action will power up any devices that are powered by switching regulator circuit 70.

Figure 2:
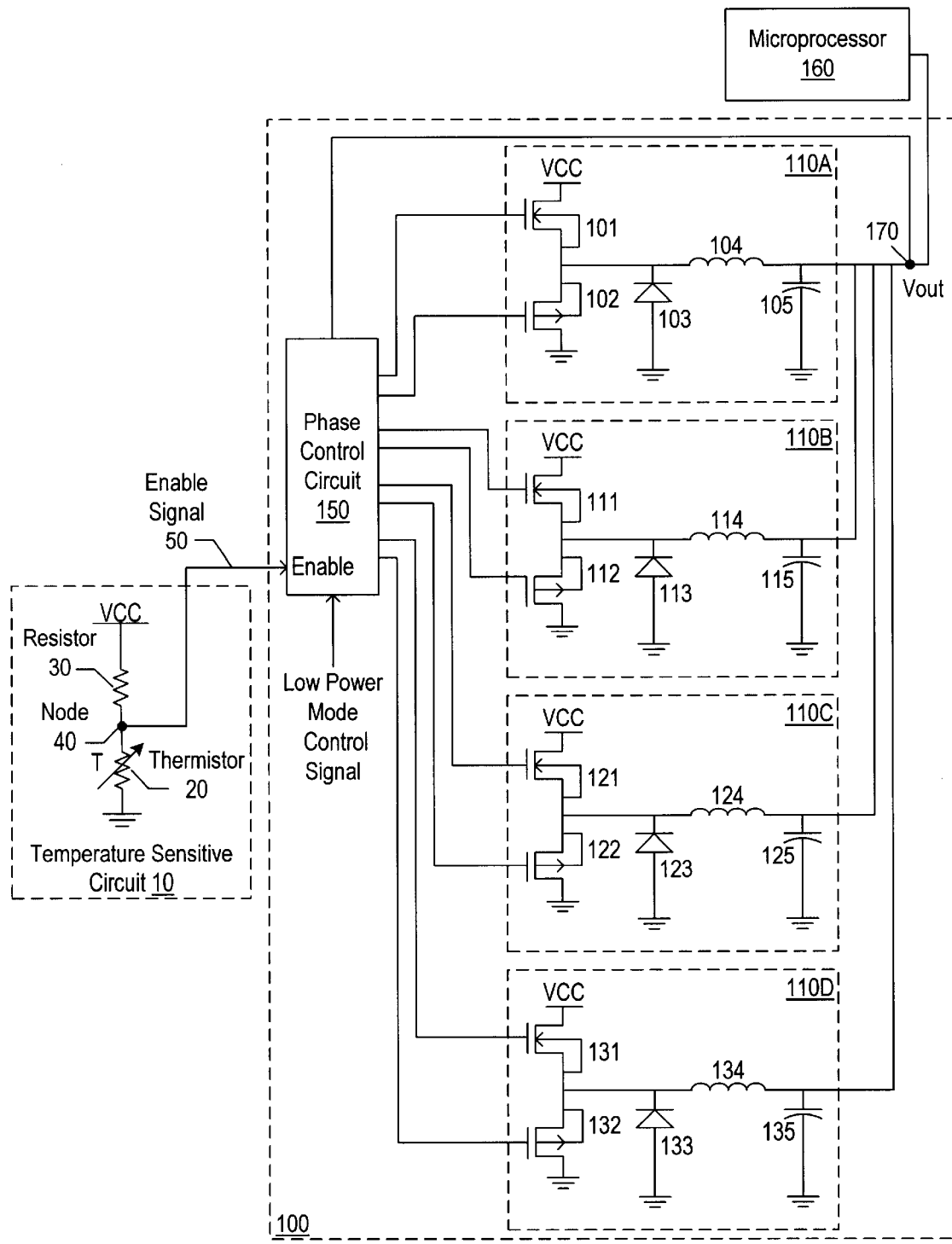
FIG. 2 is a block diagram of one embodiment of a multiphase switching power supply circuit.

Referring to FIG. 2, a block diagram of one embodiment of a multiphase switching power supply circuit is illustrated. Components that are identical to those shown in FIG. 1 are numbered identically for simplicity and clarity. The multiphase switching power supply circuit of FIG. 2 includes four switching regulator circuits 110A–D coupled to a phase control circuit 150. The output of each of switching regulator circuits 110A–D is coupled together at node Vout 170. Phase control circuit 150 is also coupled to a temperature sensitive circuit 10.

In this particular embodiment, power supply circuit 100 comprises synchronous switching regulator circuits designated as 110A, 110B, 110C and 110D. Synchronous switching regulator circuits 110A–D may, individually or collectively be referred to as switching regulator circuit 110 or switching regulator circuits 110, respectively. Switching regulator circuits 110 are coupled to provide power to microprocessor 160 at Vout 170. It is important to note that different embodiments may comprise more or less than four switching regulator circuits.

In the illustrated embodiment, each switching regulator 110 includes a pair of transistors (e.g., transistors 101 and 102, transistors 111 and 112, etc.) coupled between a power supply terminal VCC and ground. Each switching regulator 110 further includes a diode (e.g., diodes 103, 113, etc.), an inductor (e.g. inductors 104, 114, etc.) and a capacitor (e.g., capacitors 105, 115, etc.). It is noted that other specific circuit arrangements may be employed to implement each switching regulator 110.

Phase control circuit 150 is configured to generate a plurality of control signals for controlling the states of the transistors in switching regulators 110 such that the switching regulators 110 operate out of phase with respect to one another. In a particular embodiment, phase control circuit 150 may include a Semtech SC1144 integrated circuit. As will be described in further detail below, phase control circuit 150 also includes circuitry to selectively suspend operation of a subset of switching regulators 110 during a low power mode of operation to thereby allow for improved efficiency. Phase control circuit 150 also includes further circuitry to suspend operation of all of switching regulator circuits 110.

Phase control circuit 150 activates (i.e. turns on) transistors 101,111,121 and 131, respectively, during different phases of operation. During a first phase of operation ("phase 1"), transistor 101 is turned on while transistors 111, 121 and 131 are turned off. Since each switching regulator 110 is embodied as a synchronous regulator, when transistor 101 is turned on, transistor 102 is turned off (in response to a corresponding control signal from phase control circuit 150). Thus, during phase 1, current flows from VCC through transistor 101 and inductor 104 to charge capacitor 105. Also during phase 1, transistors 111, 121 and 131 are turned off, and transistors 112, 122 and 132 are turned on.

During the next phase of operation ("phase 2"), phase control circuit 150 turns off transistor 101 and turns on transistor 102. When transistor 102 is turned on and transistor 101 is turned off, current may continue to temporarily flow through inductor 104 to charge capacitor 105 since current flow through inductor 104 cannot change instantaneously. Transistor 102 provides a return path for this current.

Also during phase 2, transistor 111 of switching regulator 110B is turned on and transistor 112 is turned off.

Consequently, similar to the previous discussion, capacitor 115 is charged by current flow from VCC through transistor 111. Subsequent operations of switching regulators 510C and 510D during phases 3 and 4 are similar.

Phase control circuit 150 may be further configured to monitor the output voltage, Vout, at node 170 via a feedback control signal and adjust accordingly the duty cycle of transistors 101, 111, 121 and 131 to maintain a constant voltage level.

As stated previously, microprocessor 160 is configured to operate in a low power mode of operation. During such operation, microprocessor 160 requires less current. The low power mode of operation may be controlled by, for example, a power management unit (not shown), which detects certain system inactivity, as desired. Phase control circuit 150 is configured to selectively suspend operation of a subset of switching regulators 110 (e.g. switching regulators 110B, 110C and 110D) upon assertion of a low power mode control signal which indicates that microprocessor 160 is currently operating in a low power mode. The low power mode control signal may be received from the power management unit. In this embodiment, phase control circuit 150 suspends operation of switching regulator circuits 110B, 110C and 110D during the low power mode by removing (or otherwise driving or disabling) the control signals provided to the associated switching transistors 111, 112, 121, 122, 131 and 132 such that the transistors are held in an off state. During this mode, switching regulator 110A operates in its normal manner as described previously.

In one embodiment, phase control circuit 150 includes an enable input, which when activated by an active enable signal 50 allows normal operation of phase control circuit 150. However, when enable signal 50 is deactivated, phase control circuit 150 suspends operation of all switching regulator circuits 110. In this particular embodiment, an active signal means a logic value of one, which corresponds to a voltage level of two volts or greater. A deactivated signal refers to a logic value of zero, which corresponds to a voltage level of less than 0.8 volts. It is noted that depending on the integrated circuit used, these voltage levels may be different. It is contemplated and intended that a variety of integrated circuits may be used and therefore a range of voltage levels may be used to satisfy the input voltage specifications on a particular integrated circuit.

The output of temperature sensitive circuit 10 is connected to the enable input of phase control circuit 150. As described above in the description of FIG. 1, temperature sensitive circuit 10 may be a voltage divider circuit, which includes a thermistor 20 and a resistor 30. The voltage developed at node 40 is dependent upon the selected resistance value of resistor 30 and the ambient resistance value of thermistor 20. If the ambient temperature of thermistor 20 increases, the resulting decrease in the resistance value of thermistor 20 will cause a proportional decrease in the voltage at node 40. Conversely, a decrease in the ambient temperature of thermistor 20 will cause an increase in the voltage at node 40. Therefore, depending on the selected resistance value of resistor 30 and the range of resistance values that thermistor 20 can achieve, the voltage at node 40 may vary between zero volts and the maximum voltage level capable of developing across thermistor 20. To achieve a particular ambient temperature voltage level at node 40, proper resistance values must be calculated and chosen for resistor 30 and thermistor 20.

As described in detail above, the voltage developed at node 40 of FIG. 2 is dependent on the resistance values chosen for resistor 30 and thermistor 20. Hence, in this embodiment, resistance values are chosen such that at ambient operating temperature, the voltage at node 40 is above two volts, thus enabling phase control circuit 150 to provide switching control signals to switching regulator circuits 110.

As will be described in more detail below, thermistor 20 is located such that it may detect a rise in a temperature corresponding to the ambient operating temperature of switching regulator circuits 110. If the ambient operating temperature begins to increase, the resistance value of thermistor 20 will begin to decrease causing a proportional decrease of the voltage at node 140. If the voltage decreases below the threshold of the enable input circuitry of phase control circuit 150, then phase control circuit 150 will detect the enable signal as inactive and phase control circuit 150 will disable operation of switching regulator circuits 220. This action will power down microprocessor 160. Disabling the switching regulator circuits 110 and microprocessor 160 may advantageously reduce heat related damage to some computer system components.

If the ambient temperature begins to decrease, the resistance value of thermistor 20 will begin to increase causing a proportional increase of the voltage at node 40. If the voltage increases above the threshold of the enable input circuitry of phase control circuit 150, then phase control circuit 150 will detect the enable signal as active and phase control circuit 150 will enable operation of switching regulator circuits 110. This action will power up microprocessor 160.

Referring to FIG. 3, a diagram of one embodiment of a motherboard of a computer system including a power supply circuit is shown. Components that are identical to those shown in FIG. 1 and FIG. 2 are numbered identically for simplicity and clarity. A motherboard 300 includes a power supply circuit 100 and a microprocessor 160. Power supply circuit 200 includes phase control circuit 150, switching regulator circuits 110A, 110B, 110C and 110D and a thermistor 20.

In this embodiment, thermistor 20 is located in close proximity to switching regulator circuits 110A–D. The close proximity allows thermistor 20 to detect a temperature corresponding to the operating temperature of switching regulator circuits 110A–D. It is noted that the location of thermistor 20 shown in FIG. 3 is an example only. It is contemplated that thermistor 20 may be located in other locations which may still allow detection of a temperature corresponding to the operating temperature of switching regulator circuits 220A–D.

Numerous variations and modifications will become apparent to those skilled in the art once the above disclosure is fully appreciated. It is intended that the following claims be interpreted to embrace all such variations and modifications.

What is claimed is:

1. A power supply circuit comprising:
   a switching regulator circuit including a transistor that is configured to constantly switch between a saturation mode and a non-conducting mode during operation;
   a switching control circuit coupled to said switching regulator circuit, wherein said switching control circuit is configured to generate a plurality of switching control signals for controlling switching of said switching regulator circuit;
   a temperature sensitive circuit including a thermistor and coupled to said switching control circuit, wherein said temperature sensitive circuit having an output whose voltage level varies as a result of a variance in a voltage drop across said thermistor; and wherein said switching control circuit is further configured to suspend operation of said switching regulator circuit upon detecting a predetermined voltage level at said output.

2. The power supply circuit as recited in claim 1, wherein said temperature sensitive circuit is a voltage divider circuit including said thermistor and a resistor, wherein said voltage divider circuit is configured to provide a variable voltage level to said switching control circuit, wherein said variable voltage level is developed at a node between said thermistor and said resistor.

3. The power supply circuit as recited in claim 2, wherein said temperature sensitive circuit is further configured to detect an elevation in temperature corresponding to a temperature of said switching regulator circuit.

4. The power supply circuit as recited in claim 3, wherein said temperature sensitive circuit is further configured to develop said predetermined voltage level in response to said thermistor decreasing said internal resistance value.

5. The power supply circuit as recited in claim 2, wherein said thermistor is configured to decrease an internal resistance value in response to detecting said elevation in temperature.

6. The power supply circuit as recited in claim 5, wherein said thermistor is connected to circuit ground at a first connection and is connected to said resistor at a second connection, and wherein said resistor is connected to a supply voltage at a third connection.

7. The power supply circuit as recited in claim 1, wherein said switching control circuit further comprises an enable input, wherein said switching control circuit is further configured to detect said predetermined voltage level at said enable input.

8. A computer system comprising:
a microprocessor;
a power supply circuit coupled to said microprocessor, wherein said power supply circuit comprises:
a switching regulator circuit including a transistor that is configured to constantly switch between a saturation mode and a non-conducting mode during operation;
a switching control circuit coupled to said switching regulator circuit, wherein said switching control circuit is configured to generate a plurality of switching control signals for controlling switching of said switching regulator circuit;
a temperature sensitive circuit including a thermistor and coupled to said switching control circuit, wherein said temperature sensitive circuit having an output whose voltage level varies as a result of a variance in a voltage drop across said thermistor; and
wherein said switching control circuit is further configured to suspend operation of said switching regulator circuit upon detecting a predetermined voltage level at said output.

9. The computer system as recited in claim 8, wherein said temperature sensitive circuit is a voltage divider circuit including said thermistor and a resistor, wherein said voltage divider circuit is configured to provide a variable voltage level to said switching control circuit, wherein said variable voltage level is developed at a node between said thermistor and said resistor.

10. The computer system as recited in claim 9, wherein said temperature sensitive circuit is further configured to detect an elevation in temperature corresponding to a temperature of said switching regulator circuit.

11. The computer system as recited in claim 10, wherein said temperature sensitive circuit is further configured to develop said predetermined voltage level in response to said thermistor decreasing said internal resistance value.

12. The computer system as recited in claim 9, wherein said thermistor is configured to decrease an internal resistance value in response to detecting said elevation in temperature.

13. The computer system as recited in claim 12, wherein said thermistor is connected to circuit ground at a first connection and is connected to said resistor at a second connection, and wherein said resistor is connected to a supply voltage at a third connection.

14. The computer system as recited in claim 8, wherein said switching control circuit further comprises an enable input, wherein said switching control circuit is further configured to detect said predetermined voltage level at said enable input.

15. A power supply comprising:
a first switching regulator circuit;
a second switching regulator circuit;
a phase control circuit coupled to said first switching regulator circuit and to said second switching regulator circuit, wherein said phase control circuit is configured to generate a plurality of switching control signals for controlling switching of said first and second switching regulator circuits, wherein said phase control circuit is configured to selectively suspend operation of said second switching regulator in response to receiving a signal indicative of a low power mode of operation;
a temperature sensitive circuit including a thermistor and coupled to said phase control circuit, wherein said temperature sensitive circuit having an output whose voltage level varies as a result of a variance in a voltage drop across said thermistor; and
wherein said phase control circuit is further configured to suspend operation of said first and second switching regulator circuits upon detecting a predetermined voltage level at said output.

16. The power supply circuit as recited in claim 15, wherein said temperature sensitive circuit is a voltage divider circuit including said thermistor and a resistor, wherein said voltage divider circuit is configured to provide a variable voltage level to said phase control circuit, wherein said variable voltage level is developed at a node between said thermistor and said resistor.

17. The power supply circuit as recited in claim 16, wherein said temperature sensitive circuit is further configured to detect an elevation in temperature corresponding to a temperature of said first and second switching regulator circuits.

18. The power supply circuit as recited in claim 17, wherein said temperature sensitive circuit is further configured to develop said predetermined voltage level in response to said thermistor decreasing said internal resistance value.

19. The power supply circuit as recited in claim 18, wherein said thermistor is configured to decrease an internal resistance value in response to detecting said elevation in temperature.

20. The power supply circuit as recited in claim 19, wherein said thermistor is connected to circuit ground at a first connection and is connected to said resistor at a second connection, and wherein said resistor is connected to a supply voltage at a third connection.

21. The power supply circuit as recited in claim 15, wherein said phase control circuit further comprises an enable input, wherein said phase control circuit is further configured to detect said predetermined voltage level at said enable input.

22. A computer system comprising:
a microprocessor;
a power supply circuit coupled to said microprocessor, wherein said power supply circuit comprises:
  a first switching regulator circuit;
  a second switching regulator circuit;
  a phase control circuit coupled to said first switching regulator circuit and to said second switching regulator circuit, wherein said phase control circuit is configured to generate a plurality of switching control signals for controlling switching of said first and second switching regulator circuits, wherein said phase control circuit is configured to selectively suspend operation of said second switching regulator in response to receiving a signal indicative of a low power mode of operation;
  a temperature sensitive circuit including a thermistor and coupled to said phase control circuit, wherein said temperature sensitive circuit having an output whose voltage level varies as a result of a variance in a voltage drop across said thermistor; and
  wherein said phase control circuit is further configured to suspend operation of said first and second switching regulator circuits upon detecting a predetermined voltage level at said output.

23. The computer system as recited in claim 22, wherein said temperature sensitive circuit is a voltage divider circuit including said thermistor and a resistor, wherein said voltage divider circuit is configured to provide a variable voltage level to said phase control circuit, wherein said variable voltage level is developed at a node between said thermistor and said resistor.

24. The computer system as recited in claim 23, wherein said wherein said temperature sensitive circuit is further configured to detect an elevation in temperature corresponding to a temperature of said first and second switching regulator circuits.

25. The computer system as recited in claim 24, wherein said temperature sensitive circuit is further configured to develop said predetermined voltage level in response to said thermistor decreasing said internal resistance value.

26. The computer system as recited in claim 25, wherein said thermistor is configured to decrease an internal resistance value in response to detecting said elevation in temperature.

27. The power supply circuit as recited in claim 26, wherein said thermistor is connected to circuit ground at a first connection and is connected to said resistor at a second connection, and wherein said resistor is connected to a supply voltage at a third connection.

28. The power supply circuit as recited in claim 22, wherein said phase control circuit further comprises an enable input, wherein said phase control circuit is further configured to detect said predetermined voltage level at said enable input.

29. A power supply comprising:
a first switching regulator circuit;
a second switching regulator circuit;
a third switching regulator circuit;
a fourth switching regulator circuit;
a phase control circuit coupled to said first switching regulator circuit, said second switching regulator circuit, said third switching regulator circuit and said fourth switching regulator circuit, wherein said phase control circuit is configured to generate a plurality of switching control signals for controlling switching of said first, second, third and fourth switching regulator circuits, wherein said phase control circuit is configured to selectively suspend operation of said second, third and fourth switching regulator circuits in response to receiving a signal indicative of a low power mode of operation; and
wherein each of the first, second, third and fourth switching regulator circuits includes an inductor coupled to a first transistor and a second transistor, wherein the first transistor is coupled to pass current from a power source to said inductor when activated and wherein said second transistor is coupled to pass current from a ground node to said inductor when activated, and wherein said phase control circuit is configured to activate said first and second transistors out of phase with respect to each other;
a temperature sensitive circuit including a thermistor and coupled to said phase control circuit wherein said temperature sensitive circuit having an output whose voltage level varies as a result of a variance in a voltage drop across said thermistor; and
wherein said phase control circuit is further configured to suspend operation of said first, said second, said third and said fourth switching regulator circuits upon detecting a predetermined voltage level at said output.

30. The power supply as recited in claim 29, wherein said phase control circuit selectively suspends operation of said second, said third and said fourth switching regulator circuit during said low power mode of operation by disabling at least one of said plurality of control signals to said second, said third and said fourth switching regulator circuit, respectively.

31. The power supply as recited in claim 29, wherein each of said first, said second, said third and said fourth switching regulator circuits further comprises a capacitor coupled to receive current flowing through said inductor.

32. A computer system comprising:
a microprocessor;
a power supply circuit coupled to said microprocessor, wherein said power supply circuit comprises:
  a first switching regulator circuit;
  a second switching regulator circuit;
  a third switching regulator circuit;
  a fourth switching regulator circuit;
  a phase control circuit coupled to said first switching regulator circuit, said second switching regulator circuit, said third switching regulator circuit and said fourth switching regulator circuit, wherein said phase control circuit is configured to generate a plurality of switching control signals for controlling switching of said first, second, third and fourth switching regulator circuits, wherein said phase control circuit is configured to selectively suspend operation of said second, third and fourth switching regulator circuits in response to receiving a signal indicative of a low power mode of operation; and
  wherein each of the first, second, third and fourth switching regulator circuits includes an inductor coupled to a first transistor and a second transistor, wherein the first transistor is coupled to pass current from a power source to said inductor when activated and wherein said second transistor is coupled to pass current from a ground node to said inductor when activated, and wherein said phase control circuit is configured to activate said first and second transistors out of phase with respect to each other;

a temperature sensitive circuit including a thermistor and coupled to said phase control circuit, wherein said temperature sensitive circuit having an output whose voltage level varies as a result of a variance in a voltage drop across said thermistor; and wherein said phase control circuit is further configured to suspend operation of said first, said second, said third and said fourth second switching regulator circuits upon detecting a predetermined voltage level at said output.

33. The computer system as recited in claim 32, wherein said phase control circuit selectively suspends operation of said second, said third and said fourth switching regulator circuit during said low power mode of operation by disabling at least one of said plurality of control signals to said second, said third and said fourth switching regulator circuit, respectively.

34. The computer system as recited in claim 32, wherein each of said first, said second, said third and said fourth switching regulator circuits further comprises a capacitor coupled to receive current flowing through said inductor.

\* \* \* \* \*